US009008676B2

(12) United States Patent
Vajapeyam et al.

(10) Patent No.: US 9,008,676 B2
(45) Date of Patent: *Apr. 14, 2015

(54) RESOURCE UTILIZATION MEASUREMENTS FOR HETEROGENEOUS NETWORKS

(71) Applicant: Qualcomm Incorporated, San Diego, CA (US)

(72) Inventors: Madhavan Srinivasan Vajapeyam, San Diego, CA (US); Osok Song, San Diego, CA (US); Ajay Gupta, San Diego, CA (US); Vikas Jain, San Diego, CA (US); Tingfang Ji, San Diego, CA (US); Parag Arun Agashe, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/944,838

(22) Filed: Jul. 17, 2013

(65) Prior Publication Data
US 2013/0301461 A1 Nov. 14, 2013

Related U.S. Application Data

(63) Continuation of application No. 13/170,085, filed on Jun. 27, 2011, now Pat. No. 8,515,427.

(60) Provisional application No. 61/359,229, filed on Jun. 28, 2010.

(51) Int. Cl.
*H04W 88/02* (2009.01)
*H04W 24/02* (2009.01)
(Continued)

(52) U.S. Cl.
CPC .......... *H04W 24/02* (2013.01); *H04L 5/0007* (2013.01); *H04L 5/0032* (2013.01); *H04L 5/0044* (2013.01); *H04L 5/0062* (2013.01); *H04L 5/0091* (2013.01); *H04W 16/10* (2013.01); *H04W 72/0426* (2013.01)

(58) Field of Classification Search
USPC ........................................... 455/450
See application file for complete search history.

(56) References Cited

U.S. PATENT DOCUMENTS 8,515,427 B2 * 8/2013 Vajapeyam et al. ........... 455/436
2009/0247181 A1 10/2009 Palanki et al.
(Continued)

FOREIGN PATENT DOCUMENTS

JP 5315457 B2 10/2013
WO 2009129261 A1 10/2009
(Continued)

OTHER PUBLICATIONS

International Search Report and Written Opinion—PCT/US2011/042177—ISA/EPO—Oct. 6, 2011.

*Primary Examiner* — Diane Mizrahi
(74) *Attorney, Agent, or Firm* — Seyfarth Shaw LLP (57) ABSTRACT

Interference issues between wireless network devices are mitigated. An evolved node B (eNodeB) may experience higher cell load or higher interference when serving user equipment (UEs) that are operating in an cell range extension (CRE) area in which the UEs are strongly affected by aggressor eNodeBs. An eNodeB experiencing higher cell load or serving user equipments (UEs) under higher interference generally requests an interfering/aggressor eNodeB to repartition some of its resources. Repartitioning of resources, however, may have a negative impact on the eNodeB serving CRE area UEs. In one aspect, a new measurement of utilization accounts for CRE status and differentiates between protected and unprotected resources, such as subframes.

20 Claims, 7 Drawing Sheets

(51) Int. Cl.
*H04W 72/04* (2009.01)
*H04L 5/00* (2006.01)
*H04W 16/10* (2009.01)

(56) References Cited

U.S. PATENT DOCUMENTS

| | | |
|---|---|---|
| 2009/0257390 A1 | 10/2009 | Ji et al. |
| 2011/0275394 A1 | 11/2011 | Song et al. |
| 2011/0319090 A1* | 12/2011 | Vajapeyam et al. ........... 455/450 |
| 2012/0008511 A1 | 1/2012 | Fan et al. |
| 2012/0034926 A1 | 2/2012 | Damnjanovic et al. |
| 2012/0087266 A1 | 4/2012 | Vajapeyam et al. |
| 2012/0201152 A1 | 8/2012 | Yoo et al. |
| 2013/0028228 A1 | 1/2013 | Nakayama et al. |
| 2013/0051322 A1* | 2/2013 | Barbieri et al. ................ 370/328 |
| 2014/0112254 A1* | 4/2014 | Lindoff et al. ................. 370/328 |

FOREIGN PATENT DOCUMENTS

| | | |
|---|---|---|
| WO | 2011085399 A1 | 7/2011 |
| WO | 2011129447 A1 | 10/2011 |

\* cited by examiner

RESOURCE UTILIZATION MEASUREMENTS FOR HETEROGENEOUS NETWORKS

CROSS-REFERENCE TO RELATED APPLICATION

This application is a continuation of U.S. patent application Ser. No. 13/170,085, filed on Jun. 27, 2011, now U.S. Pat. No. 8,515,427, in the names of M. Vajapeyam et al. and assigned to the assignee hereof, which claims the benefit under 35 U.S.C. §119(e) to U.S. Provisional Patent Application No. 61/359,229 filed Jun. 28, 2010, in the names of M. Vajapeyam et al. and assigned to the assignee hereof, the disclosure of which are expressly incorporated by reference herein in their entireties.

BACKGROUND

1. Field

Aspects of the present disclosure relate generally to wireless communication systems, and more particularly to resource utilization measurements for heterogeneous networks.

2. Background

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Various aspects of the disclosure provide techniques to mitigate interference issues between wireless network devices. As explained below, an evolved node B (eNodeB) may experience higher cell load or higher interference when serving user equipments (UEs) that are operating in a cell range extension (CRE) area in which the UEs are strongly affected by aggressor eNodeBs. An eNodeB that is experiencing higher cell load or serving user equipments (UEs) under higher interference generally requests an interfering/aggressor eNodeB to repartition some of its resources. Repartitioning of resources, however, may have a negative impact on the eNodeB serving CRE area UEs. In one aspect, a new measurement of utilization is suggested that takes into account the CRE area status of UEs and differentiates between protected and unprotected subframes.

According to one aspect of the present disclosure, a method for resource utilization measurements within heterogeneous networks is described. The method includes calculating a first protected resource usage for user equipments (UEs) in a first cell range extension (CRE) area. The method further includes reporting the first protected resource usage to a first aggressor eNodeB.

In another aspect, an apparatus for resource utilization measurements within heterogeneous networks is described. The apparatus includes at least one processor; and a memory coupled to the at least one processor. The processor(s) is configured to calculate a first protected resource usage for user equipments (UEs) in a first cell range extension (CRE) area. The processor(s) is configured to report the first protected resource usage to a first aggressor eNodeB.

In a further aspect, a computer program product for resource utilization measurements within heterogeneous networks is described. The computer program product includes a computer-readable medium having program code recorded thereon. The computer program product has program code to calculate a first protected resource usage for user equipments (UEs) in a first cell range extension (CRE) area. The computer program produce also includes program code to report the first protected resource usage to a first aggressor eNodeB.

In another aspect, an apparatus for resource utilization measurements within heterogeneous networks is described. The apparatus includes means for calculating a first protected resource usage for user equipments (UEs) in a first cell range extension (CRE) area. The apparatus further includes means for reporting the first protected resource usage to a first aggressor eNodeB.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Various aspects of the disclosure provide techniques to mitigate interference issues between wireless network devices. As explained below, an evolved node B (eNodeB) may experience higher cell load or higher interference when serving user equipments (UEs) that are operating in a cell range extension (CRE) area in which the UEs are strongly affected by aggressor eNodeBs. An eNodeB that is experiencing higher cell load or serving user equipments (UEs) under higher interference generally requests an interfering/aggressor eNodeB to repartition some of its resources. Repartitioning of resources, however, may have a negative impact on the interfering eNodeB because the interfering eNodeB ends up with fewer resources available. Therefore, careful considerations should be made when determining when and how to repartition resources. In one aspect, a new measurement of utilization is suggested that takes into account the CRE status of UEs and differentiates between protected and unprotected subframes.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (ETA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
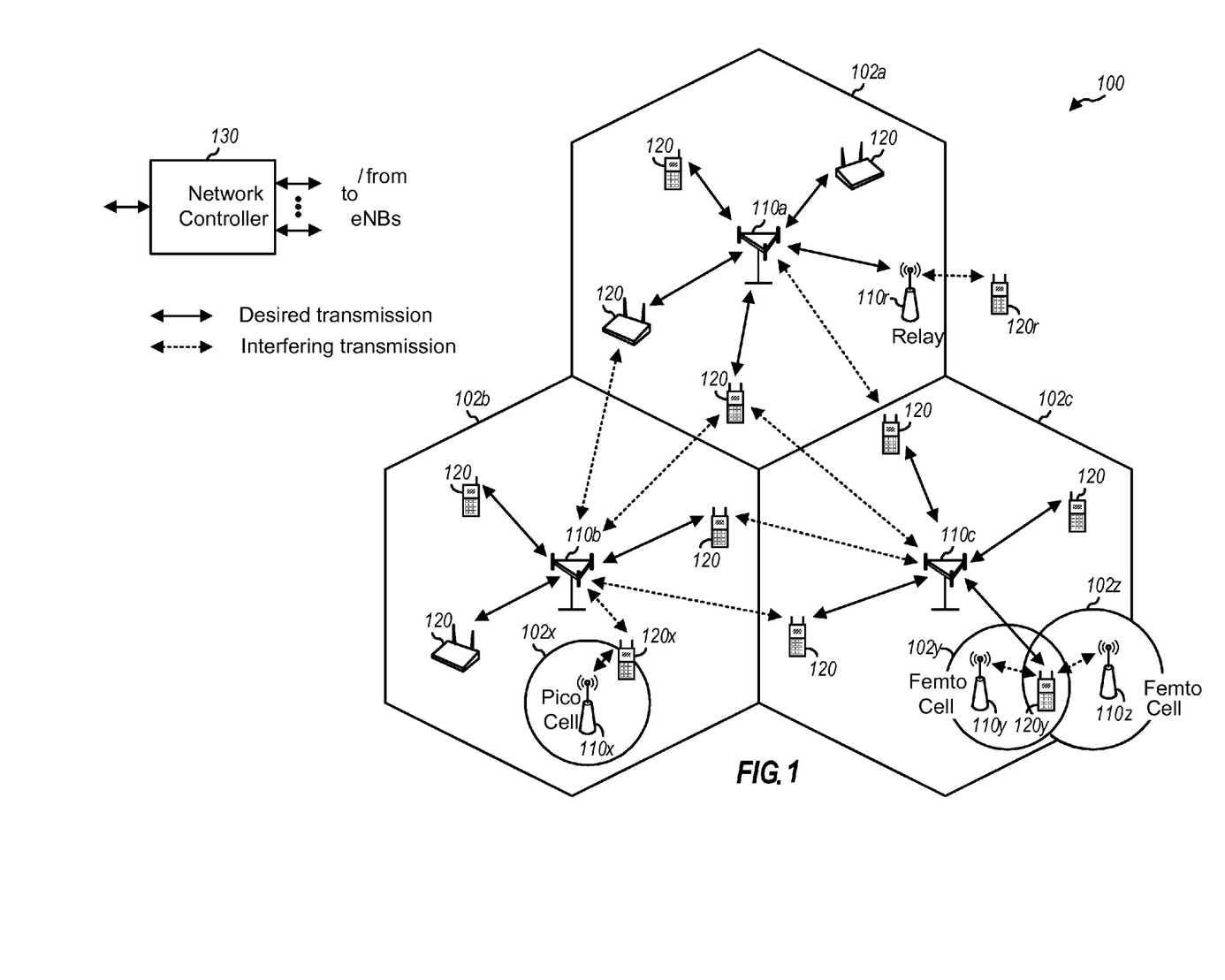
FIG. 1 is a block diagram conceptually illustrating an example of a telecommunications system.

FIG. 1 shows a wireless communication network 100, which may be an LTE-A network, in which resource utilization measurements for heterogeneous networks may be implemented. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB.

In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth.

Figure 2:
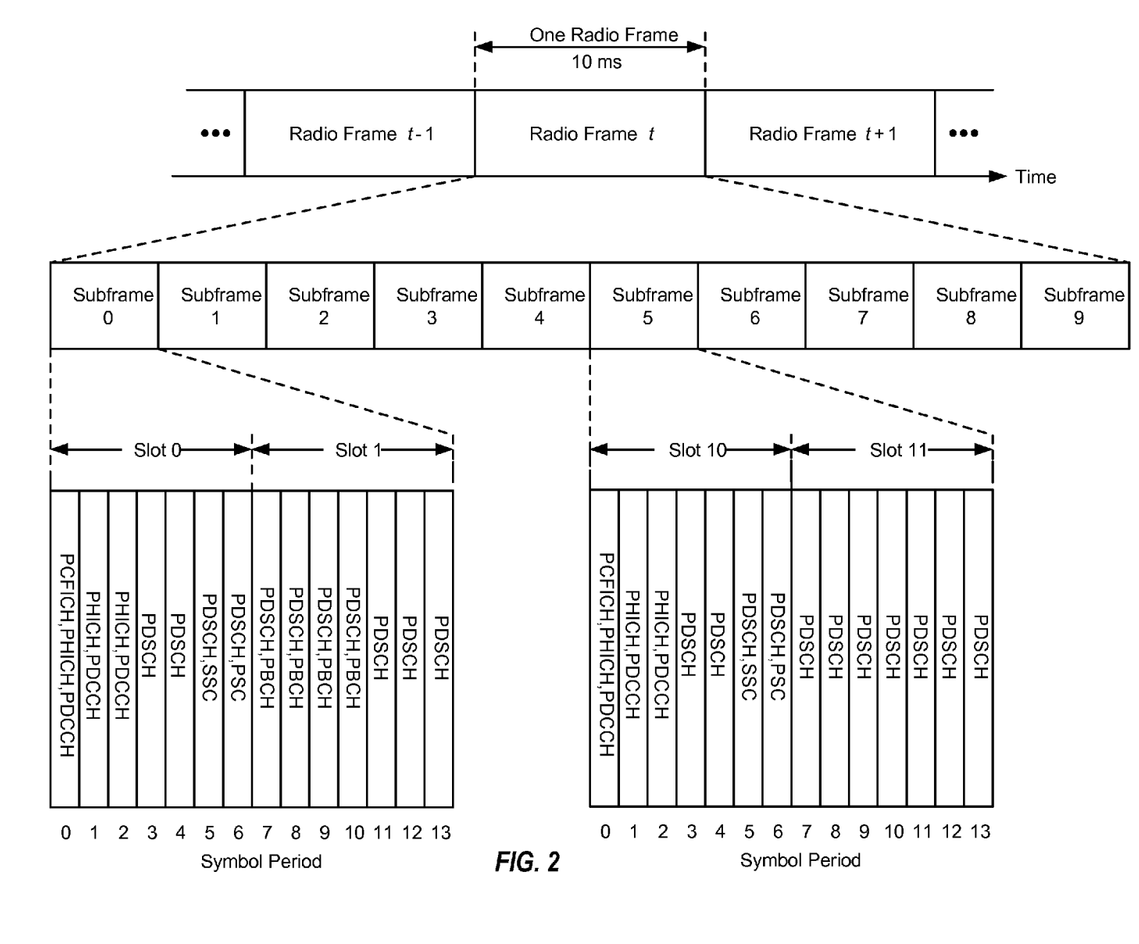
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2 L symbol periods in each subframe may be assigned indices of 0 through 2 L-1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
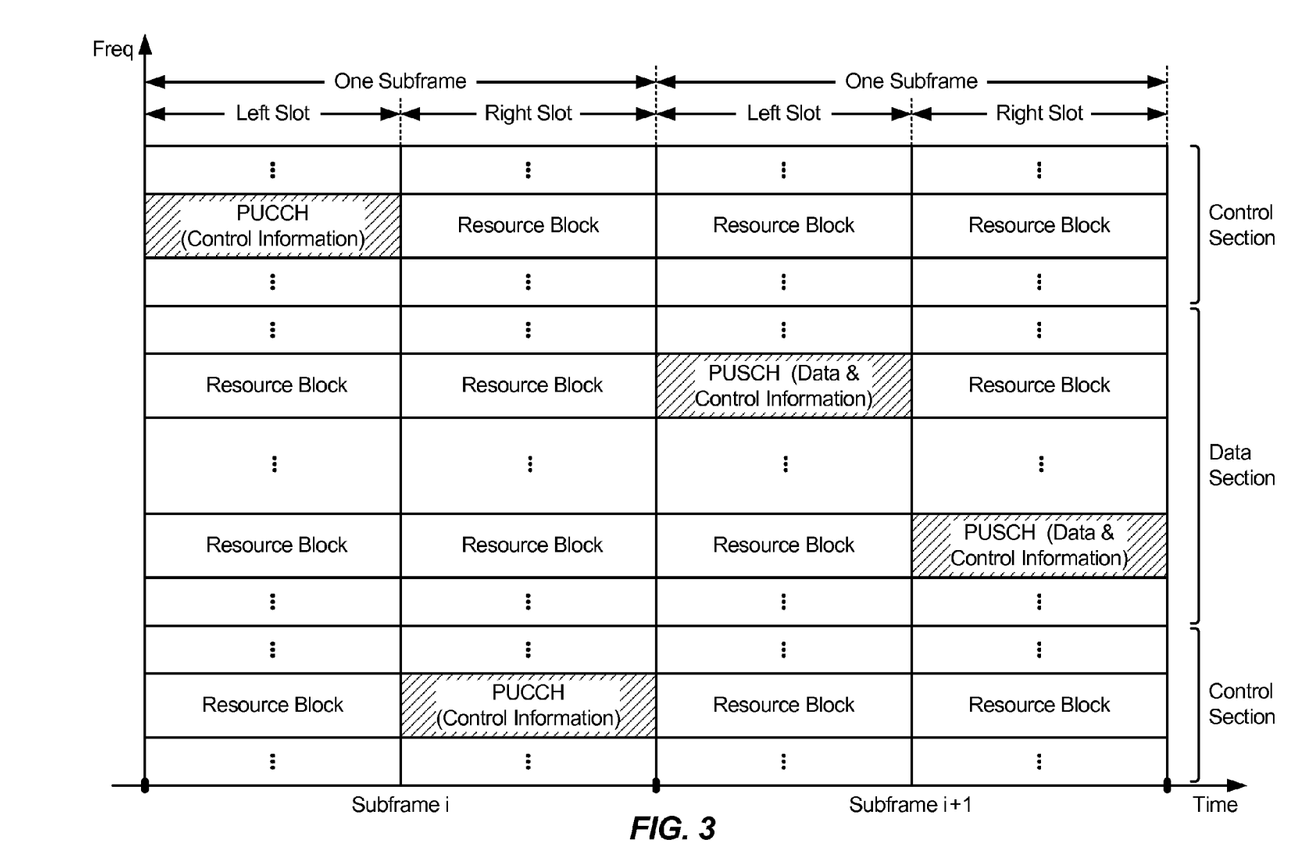
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the uplink resources. For example, a control and a data channel, parallel control channels, and parallel data channels may be transmitted by a UE.

Figure 4:
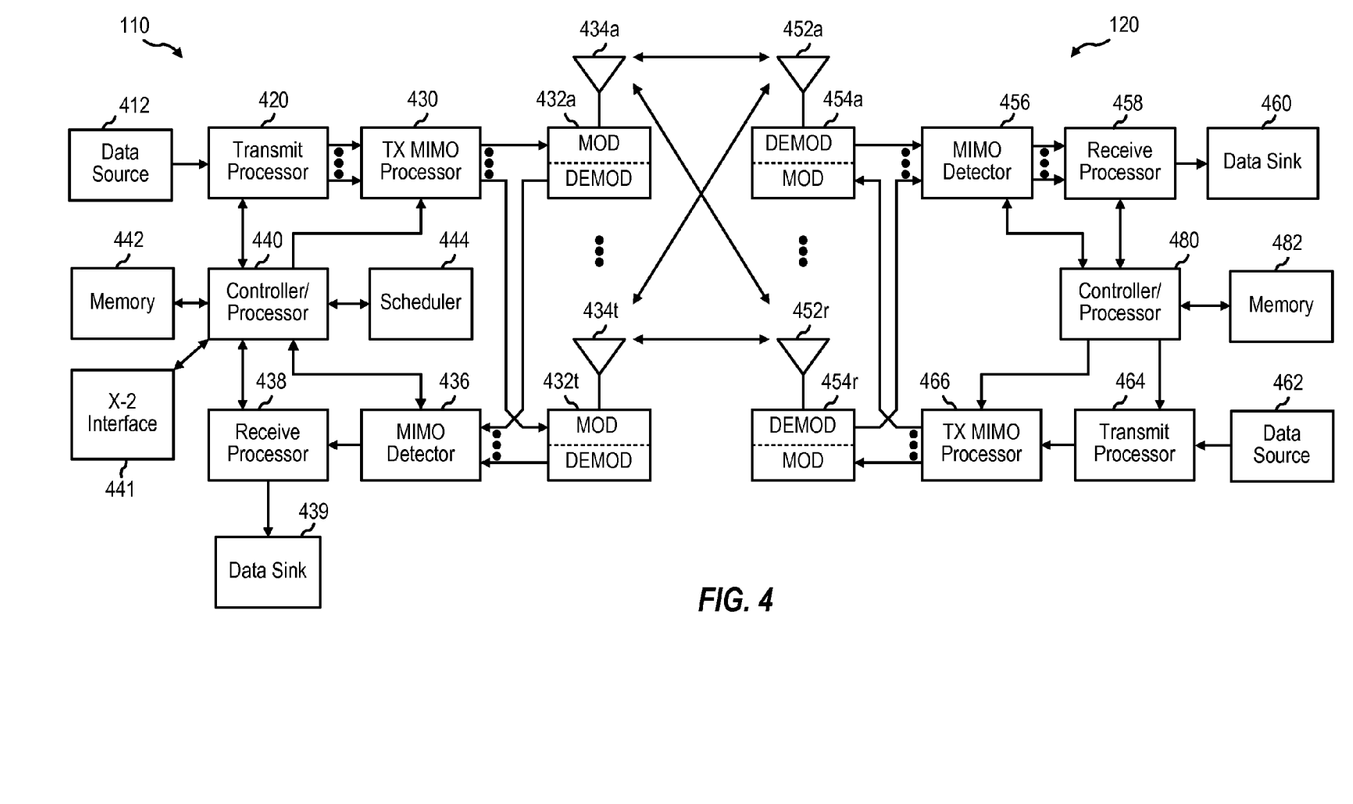
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The eNodeB 110 may be the macro eNodeB 110c in FIG. 1, and the UE 120 may be the UE 120y. The eNodeB 110 may also be a base station of some other type. The eNodeB 110 may be equipped with antennas 434a through 434t, and the UE 120 may be equipped with antennas 452a through 452r.

At the eNodeB 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the eNodeB 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the eNodeB 110. At the eNodeB 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The eNodeB 110 can send messages to other base stations, for example, over an X2 interface 441.

The controllers/processors 440 and 480 may direct the operation at the eNodeB 110 and the UE 120, respectively. The processor 440 and/or other processors and modules at the eNodeB 110 may perform or direct the execution of various processes for the techniques described herein. The processor 480 and/or other processors and modules at the UE 120 may also perform or direct the execution of the functional blocks illustrated in use method flow chart FIG. 6, and/or other processes for the techniques described herein. The memories 442 and 482 may store data and program codes for the eNodeB 110 and the UE 120, respectively. A scheduler 444 may schedule UEs for data transmission on the downlink and/or uplink.

Resource Utilization Measurements for Heterogeneous Networks

Referring back to FIG. 1, the wireless network 100 uses a diverse set of eNodeBs 110 (i.e., macro eNodeBs, pico eNodeBs, femto eNodeBs, and relays) to improve the spectral efficiency of the system per unit area. Because the wireless network 100 uses such different eNodeBs for its spectral coverage, it may also be referred to as a heterogeneous network. The macro eNodeBs 110a-c are usually carefully planned and placed by the provider of the wireless network 100. The macro eNodeBs 110a-c generally transmit at high power levels (e.g., 5 W-40 W). The pico eNodeB 110x and the relay 110r, however, generally transmit at substantially lower power levels (e.g., 100 mW-2 W). As a result, the pico eNodeB 110x and the relay 110r may be deployed in a relatively unplanned manner to eliminate coverage holes in the coverage area provided by the macro eNodeBs 110a-c and to improve capacity in the hot spots.

The femto eNodeBs 110y-z are typically deployed independently from the wireless network 100. Nevertheless, the femto eNodeBs 110y-z may be incorporated into the coverage area of the wireless network 100 either as potential access points to the wireless network 100, if authorized by their administrator(s), or at least as active and aware eNodeBs. In particular, the femto eNodeBs 110y-z may communicate with the other eNodeBs 110 of the wireless network 100 to perform resource coordination and coordination of interference management. The femto eNodeBs 110y-z typically also transmit at substantially lower power levels (e.g., 100 mW-2 W) than the macro eNodeBs 110a-c.

In operation of a heterogeneous network, such as the wireless network 100, each UE is usually served by the eNodeB 110 with the better signal quality, while the unwanted signals received from the other eNodeBs 110 are treated as interference. Unfortunately, such operational principals can lead to significantly sub-optimal performance. In one aspect, improved network performance is realized in the wireless network 100 by using resource coordination among the eNodeBs 110, better server selection strategies, and more advanced techniques for efficient interference management.

A pico eNodeB, such as the pico eNodeB 110x, is characterized by a substantially lower transmit power when compared with a macro eNodeB, such as the macro eNodeBs 110a-c. A pico eNodeB will also usually be placed around a network, such as the wireless network 100, in an ad hoc manner Because of this unplanned deployment, wireless networks with pico eNodeB placements, such as the wireless network 100, can be expected to have large areas with low signal to interference conditions, which can make for a more challenging RF environment for control channel transmissions to UEs on the edge of a coverage area or cell (a "cell-edge" UE).

Moreover, the potentially large disparity (e.g., approximately 20 dB) between the transmit power levels of the macro eNodeBs 110a-c and the pico eNodeB 110x implies that, in a mixed deployment, the downlink coverage area of the pico eNodeB 110x will be much smaller than that of the macro eNodeBs 110a-c. In additional situations, even though the transmit power of a macro eNodeB is typically higher than that of a pico or femto eNodeB, a lower-powered eNodeB, such as the femto eNodeB 110y, which serves the closed subscriber group (CSG) femto cell 102y, may cause high interference on the macro eNodeB 110c. In such cases, the macro eNodeB 110c is the victim and would use protected subframes (U/AU subframes) to service its cell range extension (CRE) area UEs.

In the uplink case, however, the signal strength of the uplink signal is governed by the UE, and, thus, will be similar when received by any type of the eNodeBs 110. With the uplink coverage areas for the eNodeBs 110 being roughly the same or similar, uplink handoff boundaries are determined based on channel gains. This can lead to a mismatch between downlink handover boundaries and uplink handover boundaries. Without additional network accommodations, the mismatch makes the server selection or the association of UE to eNodeB more difficult in the wireless network 100 than in a macro eNodeB-only homogeneous network, where the downlink and uplink handover boundaries are more closely matched.

If server selection is based predominantly on downlink received signal strength, as provided in the LTE Release 8 standard, the usefulness of mixed eNodeB deployment of heterogeneous networks, such as the wireless network 100, is substantially diminished. This is because the larger coverage area of the higher powered macro eNodeBs, such as the macro eNodeBs 110a-c, limits the benefits of splitting the cell coverage with the pico eNodeBs, such as the pico eNodeB 110x. In particular, the higher downlink received signal strength of the macro eNodeBs 110a-c attracts all of the available UEs, while the pico eNodeB 110x may not be serving any UE because of its much weaker downlink transmission power. Moreover, the macro eNodeBs 110a-c may not have sufficient resources to efficiently serve those UEs. Therefore, the wireless network 100 will attempt to actively balance the load between the macro eNodeBs 110a-c and the pico eNodeB 110x by expanding the coverage area of the pico eNodeB 110x. This concept is referred to as range extension.

The wireless network 100 achieves this range extension by changing the manner in which server selection is determined. Instead of basing server selection on downlink received signal strength, selection is based more on the quality of the downlink signal. In one such quality-based determination, server selection is performed by determining the eNodeB that offers the minimum path loss to the UE. Additionally, the wireless network 100 provides a fixed partitioning of resources between the macro eNodeBs 110a-c and the pico eNodeB 110x. Even with this active balancing of load, however, downlink interference from the macro eNodeBs 110a-c should be mitigated for the UEs served by the pico eNodeBs, such as the pico eNodeB 110x. This can be accomplished by various methods, including interference cancellation at the UE, resource coordination among the eNodeBs 110, or the like.

Figure 5:
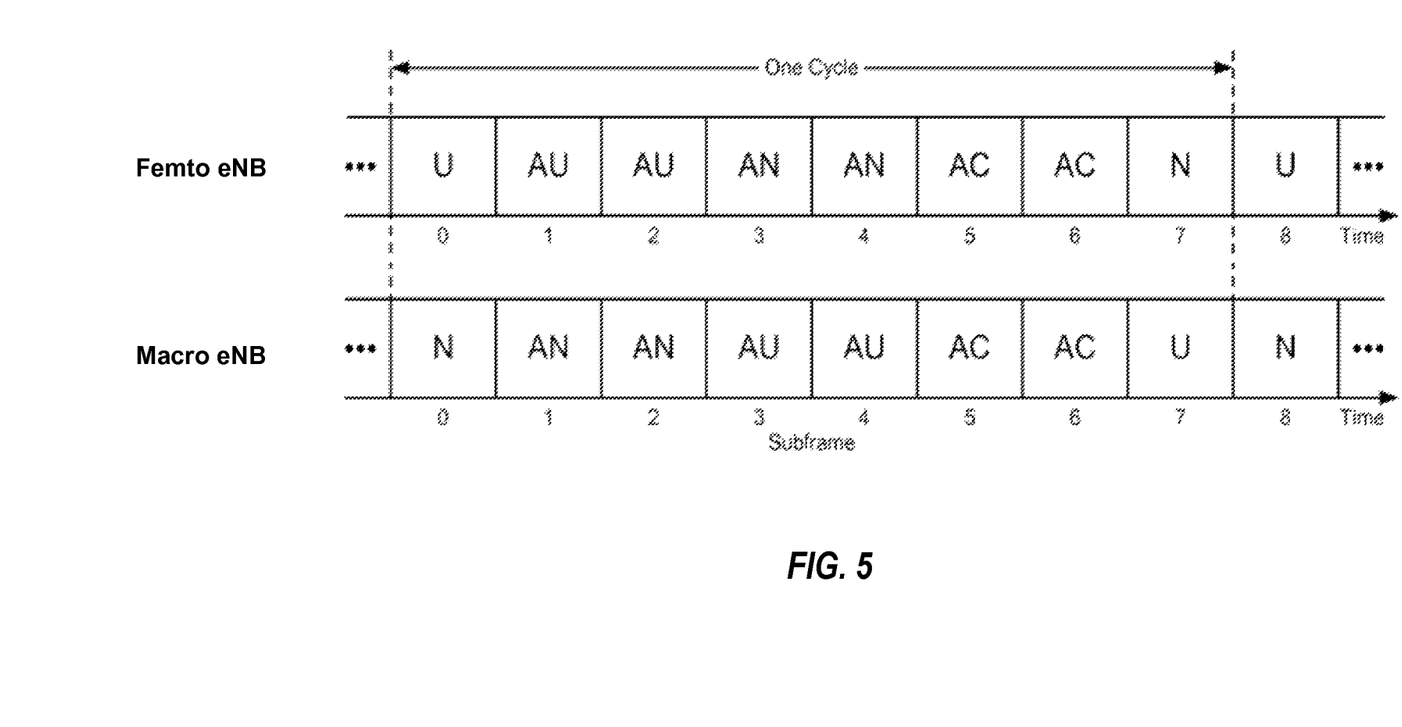
FIG. 5 is a block diagram conceptually illustrating adaptive resource partitioning in a heterogeneous network according to one aspect of the disclosure.

In a heterogeneous network with range extension, such as the wireless network 100, the lower-powered eNodeBs, such as the pico eNodeB 110x, may experience interference during the presence of stronger downlink signals transmitted from the higher-powered eNodeBs, such as the macro eNodeBs 110a-c. In one aspect, the pico eNodeB 110x engages in control channel and data channel interference coordination with the dominant interfering macro eNodeBs 110a-c to provide service for UEs. Many different techniques for interference coordination may be employed to manage interference. For example, inter-cell interference coordination (ICIC) may be used to reduce interference from cells in co-channel deployment. One ICIC mechanism is adaptive resource partitioning, an example of which is shown in FIG. 5. Adaptive resource partitioning (TDM partitioning) assigns subframes to certain eNodeBs. In subframes assigned to a first eNodeB, neighbor eNodeBs do not transmit. Thus, interference experienced by a UE served by the first eNodeB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNodeB for use exclusively by the first eNodeB. Protected subframes may also be referred to as "clean" subframes based on reduced interference from neighboring eNodeBs. Prohibited subframes are subframes assigned to a neighbor eNodeB, and the first eNodeB is prohibited from transmitting data during the prohibited subframes. For example, a prohibited subframe of the first eNodeB may correspond to a protected subframe of a second interfering eNodeB. Thus, the first eNodeB is the only eNodeB transmitting data during the first eNodeB's protected subframe. Common subframes may be used for data transmission by multiple eNodeBs. Common subframes may also be referred to as "unclean" subframes because of the possibility of interference from other eNodeBs.

At least one protected subframe is statically assigned for a given period. In some cases only one protected subframe is statically assigned. For example, if a period is 8 milliseconds, one protected subframe may be statically assigned to an eNodeB during every 8 milliseconds. Other subframes may be dynamically allocated.

Adaptive resource partitioning information (ARPI) allows the non-statically assigned subframes to be adaptively allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNodeBs of different power classes. For example, three power classes may be defined, in decreasing power class, as macro eNodeBs, pico eNodeBs, and femto eNodeBs. When macro eNodeBs, pico eNodeBs, and femto eNodeBs are in a co-channel deployment, the power spectral density (PSD) of the macro eNodeB (aggressor eNodeB) may be larger than the PSD of the pico eNodeB and the femto eNodeB (victim eNodeBs) creating large amounts of interference with the pico eNodeB and the femto eNodeB. Protected subframes may be used to reduce or minimize interference with the pico eNodeBs and femto eNodeBs. That is, a protected subframe may be scheduled for the victim eNodeB to correspond with a prohibited subframe on the aggressor eNodeB.

FIG. 5 is a block diagram illustrating TDM partitioning in a heterogeneous network according to one aspect of the disclosure. A first row of blocks illustrate sub frame assignments for a femto eNodeB, and a second row of blocks illustrate sub frame assignments for a macro eNodeB. Each of the eNodeBs has a static protected sub frame during which the other eNodeB has a static prohibited sub frame. For example, the femto eNodeB has a protected sub frame (U sub frame) in sub frame 0 corresponding to a prohibited sub frame (N sub frame) in sub frame 0. Likewise, the macro eNodeB has a protected sub frame (U sub frame) in sub frame 7 corresponding to a prohibited sub frame (N sub frame) in sub frame 7. Sub frames 1-6 are dynamically assigned as either protected sub frames (AU), prohibited sub frames (AN), and common sub frames (AC). During the dynamically assigned common sub frames (AC) in sub frames 5 and 6, both the femto eNodeB and the macro eNodeB may transmit data.

Protected sub frames (such as U/AU sub frames) have reduced interference and a high channel quality because aggressor eNodeBs are prohibited from transmitting. Prohibited sub frames (such as N/AN sub frames) have no data transmission to allow victim eNodeBs to transmit data with low interference levels. Common sub frames (such as C/AC sub frames) have a channel quality dependent on the number of neighbor eNodeBs transmitting data. For example, if neighbor eNodeBs are transmitting data on the common sub frames, the channel quality of the common sub frames may be lower than the protected sub frames. Channel quality on common sub frames may also be lower for cell range extension (CRE) area UEs strongly affected by aggressor eNodeBs. A CRE area may include any region where unprotected subframes (C/AC) experience a level of interference from neighboring eNodeBs, such that UEs in the area are unable to reliably receive unprotected subframes. For example, a CRE area UE may belong to a first eNodeB but also be located in the coverage area of a second eNodeB. A UE communicating with a macro eNodeB that is near the range limit of a femto eNodeB coverage is a CRE area UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNodeBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

As noted above, in deployments of heterogeneous networks, such as the wireless network 100, a UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the eNodeB 110y. The UE 120y, however, may not be able to access the femto eNodeB 110y due to restricted association and may then connect to the macro eNodeB 110c (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink. Using coordinated interference management, the eNodeB 110c and the femto eNodeB 110y may communicate over the backhaul or wirelessly to negotiate resources. In the negotiation, the femto eNodeB 110y agrees to cease transmission on one of its channel resources, such that the UE 120y will not experience as much interference from the femto eNodeB 110y as it communicates with the eNodeB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNodeBs. The eNodeBs in a synchronous system are presumptively synchronized across the system. Nevertheless, considering a UE that is a distance of 5 km from the macro eNodeB, the propagation delay of any downlink signals received from that macro eNodeB would be delayed approximately 16.67 μs (5 km÷3×108, i.e., the speed of light, 'c'). Comparing that downlink signal from the macro eNodeB to the downlink signal from a much closer femto eNodeB, the timing difference could approach the level of a time tracking loop (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

In the implementation of ICIC for heterogeneous networks, resource allocation provides a way of pre-allocating various resources to co-channel deployed eNodeBs. For example, referring back to FIG. 5, the femto eNodeB and macro eNodeB are part of a heterogeneous network in a co-channel deployment. Thus, the femto eNodeB and macro eNodeB share some of the same channels. To reduce or minimize interference, however, resources have been allocated such that the femto eNodeB has been pre-allocated protected subframes, the subframes 0, 1, and 2, and the macro eNodeB has been pre-allocated other protected subframes, the subframes 3, 4, and 7. The protected subframes 0 and 7 (U subframes) are statically assigned, meaning that they will be protected for use by the femto eNodeB and macro eNodeB, respectively, regardless of load or interference. The other protected subframes, subframes 1, 2, 3, and 4 (AU subframes), are protected, but, depending on how load or interference conditions change, ICIC negotiations between the femto eNodeB and the macro eNodeB may trigger repartitioning of the resources, after which the subframes 1, 2, 3, and 4 may no longer be allocated as illustrated in FIG. 5.

An eNodeB experiencing higher cell load or serving UEs under higher interference generally requests the interfering eNodeB to clear more of its resources. Repartitioning of resources, however, will have a negative impact on the interfering eNodeB because the interfering eNodeB ends up with fewer resources available. Therefore, careful considerations should be made when determining when and how to repartition resources.

One way to more carefully consider repartitioning is to examine various resource utilization measurements for the cells and eNodeBs involved in the repartition request. Existing standard measurements available for LTE/-A networks, however, are inadequate to address all of the circumstances that are important for consideration. For example, the UEs in CRE areas may be limited to the use of protected subframes (i.e., U/AU subframes). The existing measurements do not distinguish between protected subframes and unprotected subframes and/or non-CRE and CRE areas. Therefore, while a CRE area UE may be using 100% of the protected subframe resources, the utilization measurement currently available measures utilization in the context of all available subframes, both protected and unprotected subframes. Thus, the resulting measurement of the utilization of the CRE area UE will reflect a much smaller utilization percentage, even though the UE may be using 100% of the available limited resource subframes. In this scenario, while the CRE area UE is actually at 100% utilization, the low utilization measurement may prevent the competing eNodeBs from recognizing the actual resource utilization of the UE and repartitioning the subframes to provide more resources (e.g., AU subframes) to the eNodeB serving this CRE area UE.

Figure 6:
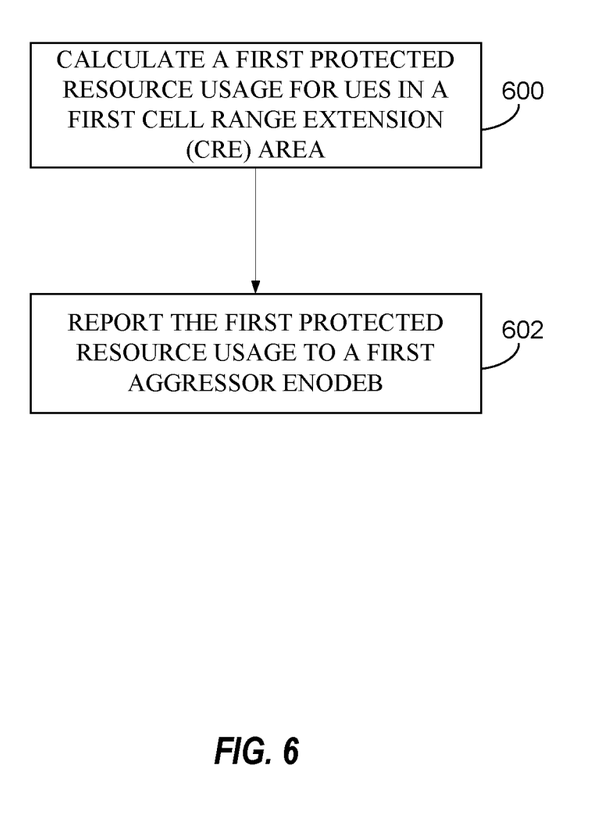
FIG. 6 is a functional block diagram illustrating example blocks executed to implement one aspect of the present disclosure.

A new measurement of utilization is suggested that takes into account the CRE area status of UEs and differentiates between protected and unprotected subframes. FIG. 6 is a functional block diagram illustrating example blocks executed to implement one aspect of the present disclosure. In block 600, a first protected resource usage for user equipments (UEs) in a first cell range extension (CRE) area is calculated. The cell range extension (CRE) area UE utilization rate is calculated by a base station for the CRE area UEs, in which the calculation is made in consideration of all of the protected subframes of the cell. The protected resources can also include resource blocks unusable due to other reasons. Optionally, the base station may calculate a non-CRE area UE utilization rate that is made in consideration of all of the subframes of the cell, excluding N/AN subframes. In block 602, the first protected resource usage is reported to a first aggressor eNodeB. In one aspect, resources are allocated based on the CRE area utilization rate and/or a number of active UEs for the CRE area and the non-CRE area. In an alternative configuration, resources may also be allocated based on the CRE area utilization rate and the non-CRE area utilization rate.

In one aspect, a cell utilization metric is determined in consideration of the CRE area UE utilization rate and the non-CRE area UE utilization rate and/or the number of active UEs for the cell range extension area and the non-cell range extension area. In one aspect, the number of active CRE and non-CRE area UEs is determined by calculating a number of active CRE and non-CRE area UEs having buffer data for data resource blocks (DRBs) on a downlink and/or an uplink during a sampling period. By differentiating between the CRE UEs and the non-CRE area UEs and/or a number of active CRE and non-CRE active UEs, and calculating the CRE area UE utilization rate using the protected subframes, the new utilization measurement returns a more accurate indication of actual cell utilization.

Figure 7:
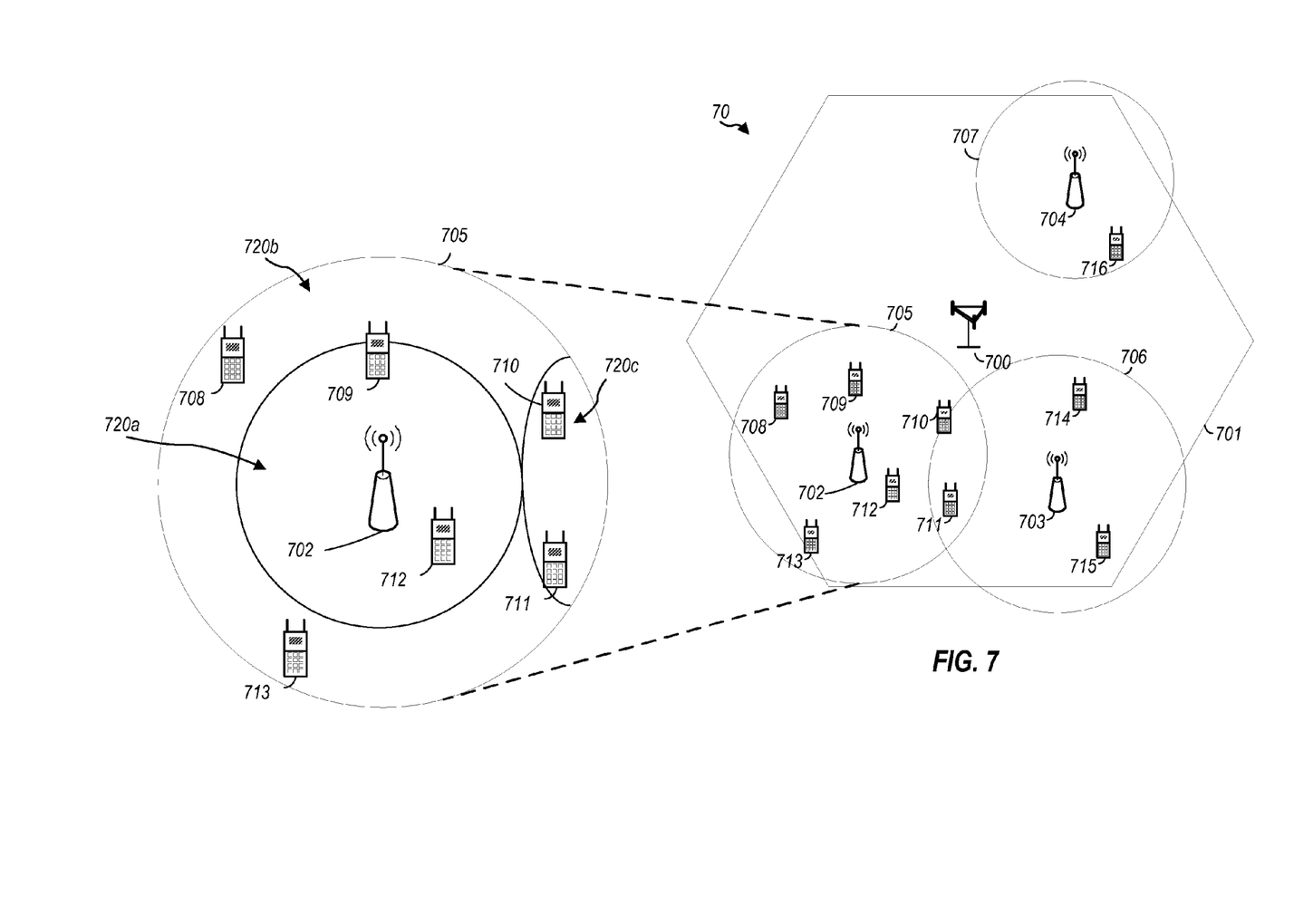
FIG. 7 is a block diagram conceptually illustrating a portion of a heterogeneous network configured according to one aspect of the present disclosure.

In operation, the utilization measurements may also be taken with respect to signal traffic priority, either or both of the uplink or downlink transmissions of the various UEs within the cell coverage area, and the like. FIG. 7 is a block diagram conceptually illustrating a portion of a heterogeneous network 70 configured according to one aspect of the present disclosure. A macro eNodeB 700 provides wireless communication access to a macro cell 701. The heterogeneous network 70 uses deployment of multiple, lower-powered pico eNodeBs, pico eNodeBs 702-704, which provide expanded coverage areas through pico cells 705-707. The available communications bandwidth is partitioned between the macro eNodeB 700 and the pico eNodeBs 702-704, such that each of the macro eNodeB 700 and the pico eNodeBs 702-704 will have some protected subframes allocated for their respective cells 701 and 705-707. The neighboring eNodeB will not be allowed to transmit on those subframes protected in the adjacent eNodeB, and vice versa.

The UEs 708-716 are located in various locations within the macro cell 701. At the time period depicted in FIG. 7, the pico eNodeB 702 is experiencing a high traffic load. Before requesting to re-partition resources to obtain additional resources to handle the increased load, the pico eNodeB 702 performs a utilization calculation for the cell 705. The pico eNodeB 702 calculates the cell utilization by calculating the resource utilization for each UE within its coverage area, i.e., the UEs 708-713. It calculates this resource utilization separately for each of the UEs within CRE areas, such as the UEs 710, 711, and 713. The UEs 710, 711, and 713 are considered to be within CRE areas 720a, c as they are either on a cell edge (the UE 713), or within the coverage area of a neighboring cell (the UEs 710-711). Moreover, the pico eNodeB 702 also calculates a separate resource utilization for these CRE UEs and non-CRE area UEs based on their traffic type, e.g., guaranteed bit rate (GBR) service, and calculates separate resource utilization on the uplink and downlink of the CRE and non-CRE area UEs.

In one aspect, the pico eNodeB 702 separately calculates resource utilizations of GBR and non GBR traffic on uplink and downlink (hence, 4 combinations) for each of the regions (e.g., non-CRE area 720a, CRE area 720b, CRE area 720c, etc.) Furthermore, because the differentiation between CRE and non-CRE area UEs is made, the pico eNodeB 702 also performs these different calculations taking into consideration which subframes are available to which types of UE in the different CRE areas. For example, CRE area UEs may only use the protected subframes or a combination of protected subframes and a subset of common subframes. Furthermore, in certain configurations CRE area UEs in certain regions, such as CRE area 720c, may be further limited based on the partitioning between adjacent pico eNodeBs and/or femto eNodeBs. Therefore, when calculating the multiple resource utilization rates of CRE area UEs, the pico eNodeB 702 calculates those rates only using the protected subframes. This provides a more accurate assessment of the actual utilization of the CRE area UEs.

For non-CRE area UEs, the pico eNodeB 702 may calculate the resource utilization rate according to the formula:

$$M(T) = \left\lfloor \frac{M1(T)}{P(T)} * 100 \right\rfloor \quad (1)$$

Where, M(T) represents the non-CRE area UE utilization, M1(T) represents all used physical resource blocks (PRBs) used by a UE, P(T) represents all available PRBs, and T represents the time period of the calculation. For example, for non-CRE area UEs P(T) may include both protected (U/AU) and unprotected (C/AC) subframes.

For CRE area UEs, the pico eNodeB 702 may calculate the resource utilization rate according to a similar formula:

$$M_{CRE}(T) = \left\lfloor \frac{M1(T)}{P_{CRE}(T)} * 100 \right\rfloor \quad (2)$$

Where, $M_{CRE}(T)$ represents the CRE area UE utilization, M1(T) represents all used physical resource blocks (PRBs) used by a CRE area UE, $P_{CRE}(T)$ represents all available PRBs in the CRE area, and T represents the time period of the calculation. Therefore, for CRE area UEs, P(T) may be limited to protected (U/AU) subframes. In further aspects, different CRE areas may include different available PRBs in their respective areas. For example, some CRE areas (depending on the placement of neighboring eNodeBs) may effectively employ certain unprotected subframes (C/AC) and, therefore, have different $P_{CRE}(T)$ values than other CRE areas.

Based on the resulting cell resource utilization rate for the pico cell 705, the pico eNodeB 702 more accurately negotiates with both the macro eNodeB 700 and the pico eNodeB 703 for repartitioning resources with the pico eNodeB 702 based on the different traffic load and resource availability of the non-CRE area UEs and one or more CRE area UEs.

In different aspects, the above calculations may be limited to any combination of uplink transmissions, downlink transmissions, control resource blocks, and data resource blocks. For example, in one aspect, $P_{CRE}(T)$ and $P(T)$ may correspond to PRBs remaining after control information has been scheduled (e.g., excluding SIBs, RACH messages, etc.).

Another metric for use in repartitioning of resources is the number of active UEs within a given cell. For example, if the UEs 714 and 715 in the pico cell 706 are performing high data rate functionality, such as the download of multimedia data, the cell utilization of the pico cell 706 will appear to be high. It may then be more difficult for the pico eNodeB 702 to negotiate for repartitioned resources that may take resources from the pico eNodeB 703. By calculating the number of active UEs within the cell, if the relative utilization appears to be similar, the number of active UEs being served may serve as a tie-breaker of sorts. Therefore, by calculating that six active UEs, the UEs 708-713, are being served in cell 705 by the pico eNodeB 702, the repartition request that the pico eNodeB 702 negotiates with the pico eNodeB 703 may result in the pico eNodeB 703 giving up some of its resources for re-allocation to the pico eNodeB 702.

The number of active UEs in any given cell may be calculated based on the UEs in the cell that have any data resource blocks (DRBs) buffered for, uplink communications, downlink communications, or any combination thereof. This number of active UEs may be calculated according to the formula:

$$M(T, p) = \left\lceil \frac{\sum_{\forall i} N(i)}{I(T, p)} \right\rceil \quad (3)$$

Where $M(T, p)$ represents the number of UEs having buffer data, $N(i)$ represents a number of UEs having buffer data during a sampling occasion, i represents a sampling occasion, p represents a sampling period length, and $I(T, p)$ represents a total number of sampling occasions during the time period, T.

In one configuration, the eNodeB 110 operable for wireless communication includes means for calculating, and means for reporting. In one aspect, the calculating means may be the controller/processor 440 and/or the memory 442. The reporting means may be the X-2 interface 441, the controller/processor 440, the memory 442, the transmit processor 420, the modulators 432a-t, and/or the antenna 434a-t configured to perform the functions recited by the aforementioned means. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, the method comprising:
   determining protected resources;
   allocating the protected resources to at least one user equipment (UE); and
   calculating protected resource usage by UEs in a cell range extension (CRE) area.

2. The method of claim 1, in which the protected resources comprise resources protected from interference by transmissions from an aggressor eNodeB.

3. The method of claim 2, in which the protected resources comprise subframes in which the aggressor eNodeB does not transmit user data.

4. The method of claim 2, in which the protected resources are determined based at least in part on a type of a serving eNodeB.

5. The method of claim 4, in which the protected resources are further determined based at least in part on a load or interference conditions.

6. The method of claim 1, further comprising calculating the protected resource usage based at least in part on data resource blocks (DRBs) within protected resources allocated to UEs in the CRE area on a downlink or an uplink during a sampling period.

7. The method of claim 1, in which the CRE area is a first CRE area, and further comprising calculating protected resource usage by UEs in a second CRE area.

8. The method of claim 1, in which protected resources in the first CRE area are protected from interference by transmissions from a first aggressor eNodeB, and protected resources in the second CRE area are protected from interference by transmissions from a second aggressor eNodeB.

9. An apparatus for wireless communication, comprising:
   a memory; and
   at least one processor coupled to the memory, the at least one processor being configured:
     to determine protected resources;
     to allocate the protected resources to at least one user equipment (UE); and
     to calculate protected resource usage by UEs in a cell range extension (CRE) area.

10. The apparatus of claim 9, in which the protected resources comprise resources protected from interference by transmissions from an aggressor eNodeB.

11. The apparatus of claim 10, in which the protected resources comprise subframes in which the aggressor eNodeB does not transmit user data.

12. The apparatus of claim 10, in which the protected resources are determined based at least in part on a type of a serving eNodeB.

13. The apparatus of claim 12, in which the protected resources are further determined based at least in part on a load or interference conditions.

14. The apparatus of claim 9, in which the at least one processor is further configured to calculate the protected resource usage based at least in part on data resource blocks (DRBs) within protected resources allocated to UEs in the CRE area on a downlink or an uplink during a sampling period.

15. The apparatus of claim 9, in which the CRE area is a first CRE area, and in which the at least one processor is further configured to calculate protected resource usage by UEs in a second CRE area.

16. The apparatus of claim 9, in which protected resources in the first CRE area are protected from interference by transmissions from a first aggressor eNodeB, and protected resources in the second CRE area are protected from interference by transmissions from a second aggressor eNodeB.

17. A computer program product for wireless communication in a wireless network, comprising:
   a computer-readable medium having program code recorded thereon that is executed by a processor, the program code comprising:
     program code to determine protected resources;
     program code to allocate the protected resources to at least one user equipment (UE); and
     program code to calculate protected resource usage by UEs in a cell range extension (CRE) area.

18. The computer program product of claim 17, in which the protected resources comprise resources protected from interference by transmissions from an aggressor eNodeB.

19. An apparatus for wireless communication, comprising:
   means for determining protected resources;
   means for allocating the protected resources to at least one user equipment (UE); and
   means for calculating protected resource usage by UEs in a cell range extension (CRE) area.

20. The apparatus of claim 19, in which the protected resources comprise resources protected from interference by transmissions from an aggressor eNodeB.

* * * * *